(12) United States Patent
Yoda et al.

(10) Patent No.: US 6,525,773 B1
(45) Date of Patent: Feb. 25, 2003

(54) IMAGE PROCESSING DEVICE AND METHOD WITH DATA BLOCK FLOW CONTROL

(75) Inventors: Kazuhiko Yoda, Tenri (JP); Yasuki Kawasaka, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/089,396

(22) Filed: Jun. 3, 1998

(30) Foreign Application Priority Data

Jun. 9, 1997 (JP) .............................................. 9-151339

(51) Int. Cl.[7] .............................................. H04N 7/18
(52) U.S. Cl. .................. 348/416; 375/240.18; 348/715; 348/717
(58) Field of Search ....................... 375/240.01–240.29; 348/699–720

(56) References Cited

U.S. PATENT DOCUMENTS

| | | | | |
|---|---|---|---|---|
| 5,579,052 A | * | 11/1996 | Artieri .................... | 375/240.15 |
| 5,589,885 A | * | 12/1996 | Ooi ............................. | 348/700 |
| 5,646,687 A | * | 7/1997 | Botsford et al. ............ | 348/402 |
| 5,701,160 A | * | 12/1997 | Kimua et al. ............... | 348/413 |
| 5,859,788 A | * | 1/1999 | Hou ....................... | 364/725.01 |
| 5,890,124 A | * | 3/1999 | Galbi et al. .................. | 704/501 |
| 5,903,312 A | * | 5/1999 | Malladi et al. ............. | 348/405 |
| 5,990,955 A | * | 11/1999 | Koz ............................ | 348/390 |
| 5,995,751 A | * | 11/1999 | Kosugi et al. .............. | 395/701 |

FOREIGN PATENT DOCUMENTS

| | | |
|---|---|---|
| JP | 7200539 | 8/1995 |
| JP | 0844709 | 2/1996 |

* cited by examiner

*Primary Examiner*—Andy Rao
(74) *Attorney, Agent, or Firm*—Birch, Stewart, Kolasch & Birch, LLP

(57) ABSTRACT

An image processing device of the present invention includes a plurality of processing sections for successively receiving and decoding a plurality of data blocks, which have been obtained by encoding a plurality of image blocks of an image. The plurality of processing sections include an inverse discrete cosine transform processing section for performing two-dimensional inverse discrete cosine transform. When one of the processing sections is unable to receive the data block, the one of the processing sections sends a busy signal to preceding one of the processing sections. When one of processing sections receives the busy signal, the one of the processing sections discontinues data block transfer to following one of the processing sections.

22 Claims, 13 Drawing Sheets

FIG.6

| State | State description | Transition condition |
|---|---|---|
| ST0 | Wait | EOB=Active ⟶ ; (EOB/=Active)and(Iadr=63) ⟶ |
| ST1 | One buffer full | (EOB=Active)and(Iadr<63) ⟶ ; (Iadr=63) ⟶ |
| ST2 | Both buffers full | |

FIG.7

| State | State description | Transition condition |
|---|---|---|
| ST0 | Wait | Iadr=Latency ⟶ ; (WaitFlg=Active)or(Istate=ST0) ⟶ |
| ST1 | Output operation result | |

FIG.8

Conditional register 1

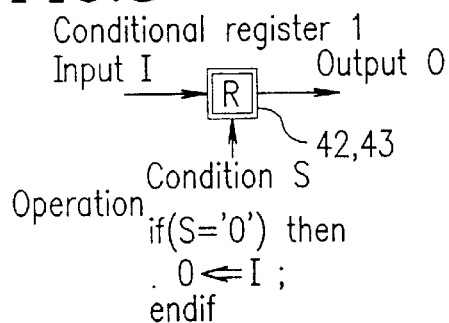

42, 43

Operation
if(S='0') then
  O ⇐ I ;
endif

FIG.9

Conditional register 2

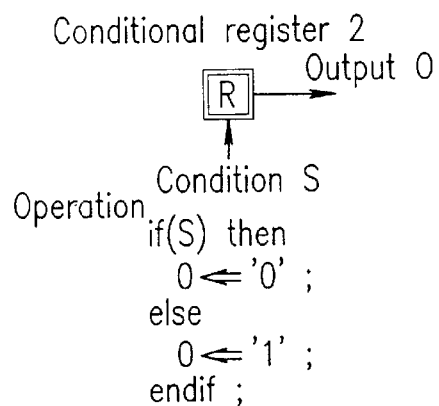

Operation
if(S) then
  O ⇐ '0' ;
else
  O ⇐ '1' ;
endif ;

Register array Ra  33,34

I,O ········ 1 bit
Ai,Ar ····· Each represents ($x_1:x_0$)
$x_1,x_0$ ····· Represent a location in register array Ra Operation
if(W='0') then
  Ra(conv_integer('0'&Ai)) <= I ;
endif ;
  O <= Ra(conv_integer('0')&Ar) ;

Address generation circuit  31,32

Operation
Address <= Adrin when((xwrtin='0')and(flag='0'))else Radrs ;
Data <= Din ;
WEB <= '0'when((xwrtin='0')and(flag='0'))else '1' ;

Addition

Subtraction

IMAGE PROCESSING DEVICE AND METHOD WITH DATA BLOCK FLOW CONTROL

BACKGROUND OF THE INVENTION

1. Field of the Invention

The present invention relates to an image processing device for dividing an image into a plurality of image blocks, encoding the image blocks into image data and decoding the image data back into the image blocks. More particularly, the present invention relates to an image processing device which performs a discrete cosine transform (hereinafter, abbreviated as "DCT") and an inverse discrete cosine transform (hereinafter, abbreviated as "IDCT").

2. Description of the Related Art

As a method for compressing and decompressing a moving image, those employing DCT and IDCT have been commonly known. In such a method, a two-dimensional moving image is divided into square-shaped blocks each including N×N pixels (hereinafter, referred to simply as "image blocks"). The image data is compressed or decompressed by performing DCT or IDCT for each block of image data. By decomposing the image data using DCT, low frequency components, essential for reproduction of the image, can be extracted from the image data, since an actual image (or picture) contains only a small amount of high frequency components (e.g., those of the outline of an object). Based on this, image blocks can be compressed into image data.

The DCT and IDCT operations can be represented by the following Expressions (1) and (2), respectively:

$$F(u, v) = \frac{2}{N} \sum_{x=0}^{N-1} \sum_{y=0}^{N-1} C(x)C(y)F(x, y)\cos\frac{(2u+1)x\pi}{2N}\cos\frac{(2v+1)y\pi}{2N} \quad (1)$$

$$F(x, y) = \frac{2}{N} \sum_{u=0}^{N-1} \sum_{v=0}^{N-1} C(u)C(v)F(u, v)\cos\frac{(2x+1)u\pi}{2N}\cos\frac{(2y+1)v\pi}{2N} \quad (2)$$

where N denotes the number of pixels in a row or a column in one image block, whereby the total number of pixels in the block is N×N;

F(u,v) denotes image data obtained by DCT, wherein u and v represent a location of the data within the block; and f(x,y) denotes image data obtained by IDCT, wherein x and y represent a location of the data within the block.

C(k) in Expressions (1) and (2) can be represented by Expression (3) below.

$$C(k) = \begin{cases} \frac{1}{\sqrt{2}} & (k = 0) \\ 1 & (k = 1 \sim 7) \end{cases} \quad (3)$$

As is apparent from comparison between Expressions (1) and (2), DCT and IDCT are substantially the same transform operations, and thus can be implemented with the same circuit configuration by changing coefficients. Therefore, while IDCT will be mainly discussed in the following description, such discussion applies also to DCT.

Two-dimensional IDCT, as represented by Expression (2), is typically implemented by twice performing one-dimensional IDCT (as represented by Expression (5) below). Expression (5) is derived from Expression (2) in such a manner, as in the following Expression (4).

$$f(x, y) = \quad (4)$$
$$\sqrt{\frac{2}{N}} \sum_{v=0}^{N-1} C(v)\cos\frac{(2y+1)v\pi}{2N}\left(\sqrt{\frac{2}{N}} \sum_{u=0}^{N-1} C(u)F(u, v)\cos\frac{(2x+1)u\pi}{2N}\right)$$

$$f(k) = \sqrt{\frac{2}{N}} \sum_{n=0}^{N-1} C(n)F(n, k)\cos\frac{(2k+1)n\pi}{2N} \quad (5)$$

The one-dimensional IDCT of Expression (5) is repeated twice as follows. First, the one-dimensional IDCT is performed along the row (horizontal) direction, and then the one-dimensional IDCT along the column (vertical) direction is performed for the transform results, thereby obtaining a result which is equivalent to what is obtained by a single two-dimensional IDCT operation.

The one-dimensional IDCT, or Expression (5) above, is a simple product sum operation using a cosine function as a coefficient. Therefore, the circuit configuration required for implementing Expression (5) is relatively simple, and two-dimensional IDCT can thus be implemented more easily. Such a technique of repeating a one-dimensional transform twice instead of performing a single two-dimensional transform operation is disclosed in Japanese Laid-open Publication Nos. 7-200539 and 8-44709.

FIG. 19 schematically illustrates an image processing device employing IDCT based on the standard image compression/decompression method, MPEG. The image processing device receives encoded image data by image blocks each including N×N pixels. The image data is further grouped in macroblocks each including up to six data blocks (respectively for luminance data, chromaticity data, and the like). Thus, a macroblock including a plurality of data blocks is input for one image block including N×N pixels. Each data block is passed on from a VLD (Variable Length Decoding) section 101 to an IS (Inverse Scan) section 102, an IQ (Inverse Quantization) section 103, an IDCT section 104 and then to an MC (Motion Compensation) section 105. A certain operation is performed for the transferred data block at each section.

Each of the VLD section 101, the IS section 102, the IQ section 103 and the IDCT section 104 processes one data block at a time, and does so only after the preceding section (i.e., a section which processes the block immediately before the subject section) completely processes that particular block. The last section, i.e., the MC section 105, first receives all data blocks for the macroblock, and then performs an MC operation between the newly-received macroblock of data and the preceding macroblock of data which is input from a memory section 106, thereby creating and outputting image data corresponding to the image block of N×N pixels.

A control section 107 generally controls the sections 101 to 105. Since the sections 101 to 104 each require a different amount of time for processing one data block, while the last section, i.e., the MC section 105, processes data by macroblocks, the control section 107 successively provides respective operation timings for the sections 101 to 105.

FIG. 20 illustrates a configuration of the IDCT section 104. The IDCT section 104 includes two one-dimensional IDCT sections 111 and 112, an inversion memory 113 provided therebetween and a control section 114.

The IDCT section 104 operates as follows. The one-dimensional IDCT section 111 performs one-dimensional IDCT for a data block. The transform result is temporarily stored in the inversion memory 113. Then, the one-dimensional IDCT section 112 performs one-dimensional IDCT for the stored transform result, thereby outputting a result which is equivalent to what is obtained by a single two-dimensional IDCT operation. The control section 114 generally controls the sections 111 to 113.

FIG. 21 is a timing diagram illustrating the operation timings of the respective sections 101, 103, 104 and 105 illustrated in FIG. 19. The IS section 102 is omitted in FIG. 21 since the operation thereof is negligibly short in time compared to those of the other sections.

As is apparent from this timing diagram, the VLD section 101 first processes a first data block B1. After the VLD section 101 completely processes the block B1, the IQ section 103 starts to process the block B1. Similarly, after the IQ section 103 completely processes the block B1, the IDCT section 104 starts to process the block B1. Then, after the IDCT section 104 completely processes the block B1, the sections 101 to 104 successively process a second data block B2, after which the sections 101 to 104 process a third data block B3 in the same manner. After the first to third data blocks B1 to B3, which correspond to one macroblock in this instance, have all been processed by the respective sections 101 to 104, the MC section 105 starts processing the macroblock of data.

Since one data block is processed successively by the VLD section 101, the IQ section 103 and the IDCT section 104, the control section 107 has to control the operation timings of the respective sections 101 to 104. Moreover, since the MC section 105 adds together the data block from the memory section 106 and the data block from the IDCT section 104, the control section 107 has to match the respective timings of the data blocks to be input to the MC section 105.

However, when the control section 107 is responsible for all such timing controls, the control section 107 becomes complicated.

Also in the IDCT section 104 illustrated in FIG. 20, since the control section 114 is responsible for controlling the operation timings of the one-dimensional IDCT sections 111 and 112, the control section 114 is complicated.

It is possible to provide only a single one-dimensional IDCT section and to process the same data block twice with that one-dimensional IDCT section. In such a case, however, the control section 114 becomes even more complicated.

Moreover, as can be seen from the timing diagram of FIG. 21, there are time gaps t1, t2, . . . , resulting between two operations performed by the IDCT section 104, which requires the longest processing time. It is apparent that such time gaps are wasteful and thus lengthen the overall processing time.

SUMMARY OF THE INVENTION

According to one aspect of this invention, an image processing device includes a plurality of processing sections for successively receiving and decoding a plurality of data blocks, which have been obtained by encoding a plurality of image blocks of an image. The plurality of processing sections include an inverse discrete cosine transform processing section for performing two-dimensional inverse discrete cosine transform. When one of the processing sections is unable to receive the data block, the one of the processing sections sends a busy signal to preceding one of the processing sections. When one of processing sections receives the busy signal, the one of the processing sections discontinues data block transfer to following one of the processing sections.

In one embodiment of the invention, the inverse discrete cosine transform processing section includes: a memory section for temporarily storing a plurality of data blocks; an operation section for successively performing an inverse discrete cosine transform for the data blocks stored in the memory section; and a control section for successively storing/erasing the data blocks in/from the memory section, the control section sending a busy signal to preceding one of the processing sections when the memory section is filled with the data blocks.

In one embodiment of the invention, the control section erases one of the data blocks stored in the memory section which has been processed so that a new data block may be stored in the memory section, while another one of the data blocks in the memory section is being processed by the operation section.

In one embodiment of the invention, the memory section includes first and second memory sections each for temporarily storing a plurality of data blocks. The operation section includes first and second operation sections each for performing a one-dimensional inverse discrete cosine transform. Each one of the data blocks is first stored in the first memory section, the first operation section performing a one-dimensional inverse discrete cosine transform for the data block, after which the data block is transferred to the second memory section, the second operation section performing a one-dimensional inverse discrete cosine transform for the data block, thus performing a two-dimensional inverse discrete cosine transform for the data block.

In one embodiment of the invention, the control section includes first and second control sections respectively for controlling the first and second operation sections. The first control section erases one of the data blocks stored in the first memory section which has been processed so that a new data block may be stored in the first memory section, while another one of the data blocks in the first memory section is being processed by the first operation section. The second control section erases one of the data blocks stored in the second memory section which has been processed so that a new data block may be stored in the second memory section, while another one of the data blocks in the second memory section is being processed by the second operation section.

In one embodiment of the invention, the control section includes first and second control sections respectively for controlling the first and second operation sections. The first control section sends a busy signal to preceding one of the processing sections while the first and second memory sections are both filled with data blocks.

In one embodiment of the invention, the second control section sends a busy signal to the first control section while the second memory section is filled with data blocks.

In one embodiment of the invention, each of the processing sections is provided with a memory section for storing at least one data block. One of the processing sections sends a busy signal to preceding one of the processing sections while the memory section of the one of the processing sections is filled with data blocks.

In one embodiment of the invention, the processing sections includes: a variable length decoding section; an inverse scan section; an inverse quantization section; an inverse DCT section; and a motion compensation section.

In one embodiment of the invention, each of the variable length decoding section, inverse scan section, the inverse quantization section and the inverse DCT section is provided with a memory section for storing at least one data block. One or more of the variable length decoding section, inverse scan section, the inverse quantization section and the inverse DCT section sends a busy signal to preceding one of the processing sections while the memory section of the one of the sections is filled with data blocks.

In one embodiment of the invention, the motion compensation section includes a memory section for storing a plurality of data blocks, and sends a busy signal to preceding one of the processing sections while the memory section of the motion compensation section is filled with a plurality of data blocks.

According to another aspect of this invention, an image processing device includes a plurality of processing sections for successively receiving and decoding a plurality of data blocks, which have been obtained by encoding a plurality of image blocks of an image, the plurality of processing sections including an inverse discrete cosine transform processing section for performing a two-dimensional inverse discrete cosine transform. The inverse discrete cosine transform processing section includes: a memory section for temporarily storing a plurality of data blocks; an operation section for successively performing an inverse discrete cosine transform for the data blocks stored in the memory section; and a control section for erasing one of the data blocks stored in the memory section which has been processed so that a new data block may be stored in the memory section, while another one of the data blocks in the memory section is being processed by the operation section.

In one embodiment of the invention, the memory section includes first and second memory sections each for temporarily storing a plurality of data blocks; the operation section includes first and second operation sections each for performing a one-dimensional inverse discrete cosine transform; and each one of the data blocks is first stored in the first memory section, the first operation section performing a one-dimensional inverse discrete cosine transform for the data block, after which the data block is transferred to the second memory section, the second operation section performing a one-dimensional inverse discrete cosine transform for the data block, thus performing a two-dimensional inverse discrete cosine transform for the data block.

In one embodiment of the invention, the control section includes first and second control sections respectively for controlling the first and second operation sections. The first control section erases one of the data blocks stored in the first memory section which has been processed so that a new data block may be stored in the first memory section, while another one of the data blocks in the first memory section is being processed by the first operation section. The second control section erases one of the data blocks stored in the second memory section which has been processed so that a new data block may be stored in the second memory section, while another one of the data blocks in the second memory section is being processed by the second operation section.

Thus, the invention described herein makes possible the advantage of providing an image processing device which can reduce the overall processing time with simple control.

This and other advantages of the present invention will become apparent to those skilled in the art upon reading and understanding the following detailed description with reference to the accompanying figures.

BRIEF DESCRIPTION OF THE DRAWINGS

FIG. 6 is a diagram illustrating state transition of the input state section in the former-stage control section illustrated in FIG. 5.

FIG. 7 is a diagram illustrating state transition of the output state section in the former-stage control section illustrated in FIG. 5.

FIG. 8 is a diagram illustrating operation condition of a register in the former-stage control section illustrated in FIG. 5.

FIG. 9 is a diagram illustrating operation condition of another register in the former-stage control section illustrated in FIG. 5.

DESCRIPTION OF THE PREFERRED EMBODIMENTS

Hereinafter, the present invention will be described by way of illustrative examples with reference to the accompanying figures.

Figure 1:
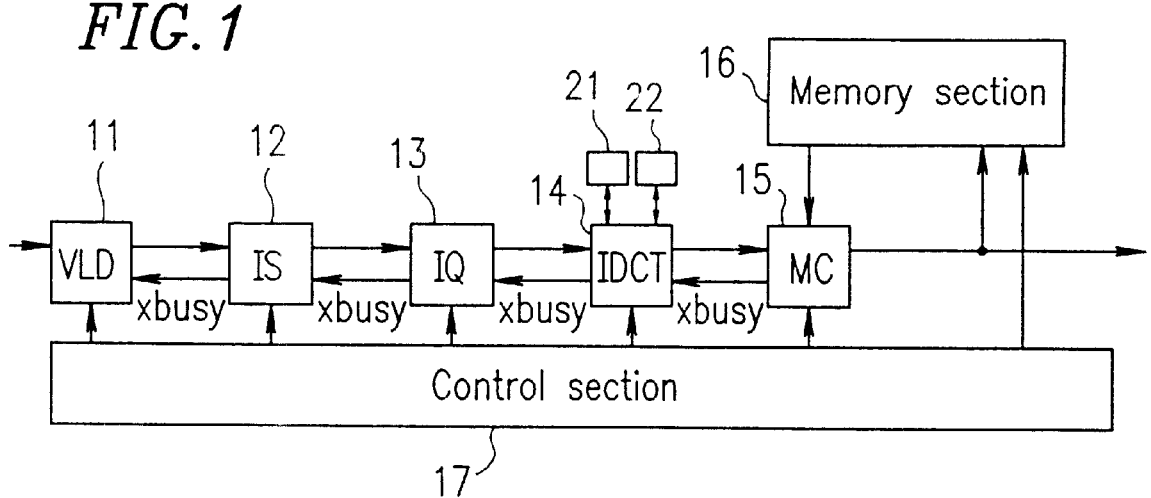
FIG. 1 is a block diagram schematically illustrating an image processing device according to an example of the present invention.

FIG. 1 schematically illustrates an image processing device according to an example of the present invention. The image processing device successively receives macroblocks of data, each including a plurality of data blocks obtained by encoding a plurality of image blocks, and decodes the encoded data blocks. The image processing device employs two-dimensional IDCT.

Each data block is passed on from a VLD section 11 to an IS section 12, an IQ section 13, an IDCT section 14 and then to an MC section 15. A certain operation is performed for the transferred data block at each section. When one of the sections 11 to 15 is unable to receive a data block, the section sends a busy signal xbusy to the preceding section. When one of the sections 11 to 15 receives the busy signal xbusy, the section discontinues data block transfer to the following section (i.e., a section which processes the block immediately after the subject section). As a result, data blocks can be transferred through the sections in a reduced period of time.

For example, the sections 11 to 15 may each be provided with a memory for temporarily storing at least one data block. In such a case, each section processes the data block stored in the memory, and the next data block is received and stored in the memory when the processed data block has been erased from the memory. While there is a data block in the memory, the section sends the busy signal xbusy to the preceding section.

Thus, the sections 11 to 15 can operate individually at their own operation timings. As a result, the responsibility on a control section 17 is greatly reduced, thereby simplifying the configuration thereof.

The IDCT section 14 includes a first memory 21 and a second memory 22. The IDCT section 14 stores data blocks received from the IQ section 13 alternately in the first and second memories 21 and 22, and successively performs two-dimensional IDCT for the data blocks. Thereafter, the IDCT section 14 erases the processed data block from the memory, so that a new data block may be stored therein. As a result, the IDCT section 14 is capable of uninterruptedly processing input data blocks.

However, the IDCT section 14 activates the busy signal xbusy to the former IQ section 13, if neither of the data blocks stored in the first and second memories 21 and 22 has been completely processed.

Figure 2:
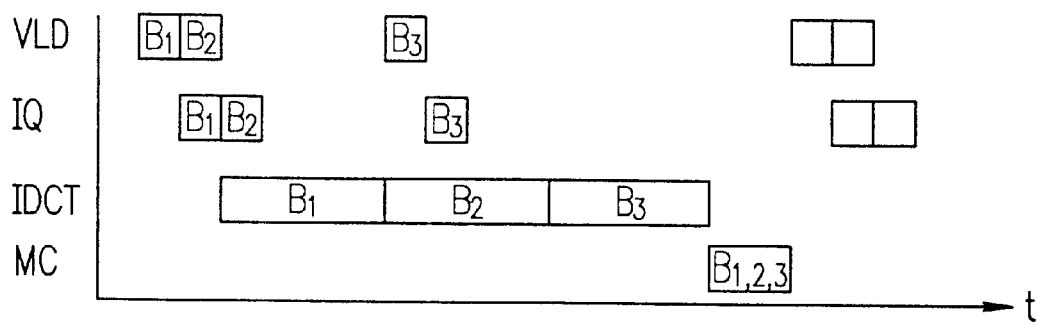
FIG. 2 is a timing diagram illustrating operation timings of the processing sections in the device illustrated in FIG. 1.

FIG. 2 is a timing diagram illustrating operation timings of the respective sections 11, 13, 14 and 15 illustrated in FIG. 1. The IS section 12 is omitted in FIG. 2 since the operation thereof is negligibly short in time compared to those of the other sections.

As can be seen from this timing diagram, the VLD section 11 and the IQ section 13 uninterruptedly process the first and second data blocks B1 and B2. The VLD section 11 and the IQ section 13 do not process the third data block B3 successively after the data blocks B1 and B2 because the IDCT section 14 activates the busy signal xbusy to the preceding section when the first and second data blocks B1 and B2 have been stored in the first and second memories 21 and 22 of the IDCT section 14.

When the first data block B1 in the first memory 21 of the IDCT section 14 has been completely processed and then erased therefrom, the IDCT section 14 inactivates the busy signal xbusy to the preceding section, whereby the VLD section 11 and the IQ section 13 process the third data block B3. After being processed the third data block B3 is stored in the first memory 21 of the IDCT section 14.

When the IDCT section 14 has processed all of the first to third data blocks B1 to B3, which correspond to one macroblock in the illustrated example, the MC section 15 starts processing the macroblock including the data blocks B1 to B3.

As described above, the IDCT section 14 is provided with the first and second memories 21 and 22 so as to alternately store and successively process the input data blocks. In this way, the IDCT section 14 is capable of uninterruptedly processing the input data blocks, thereby reducing the overall processing time.

Figure 3:
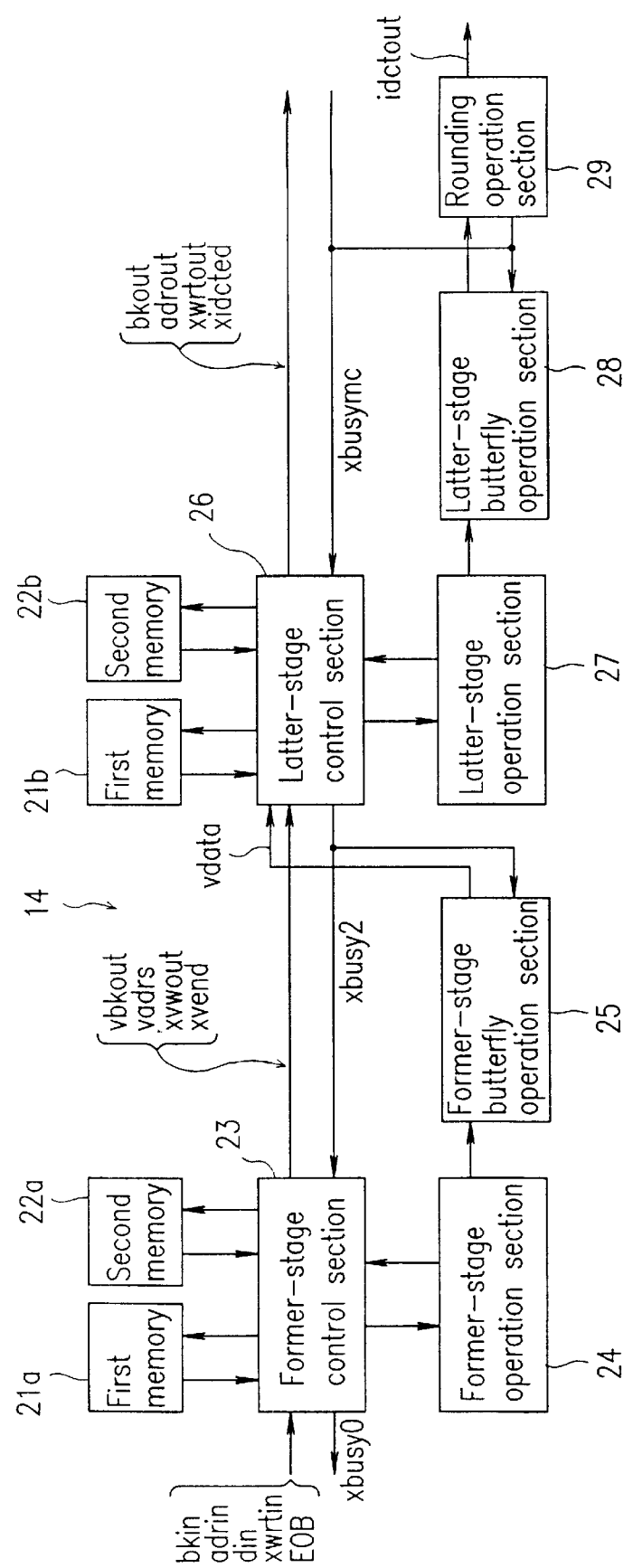
FIG. 3 is a block diagram illustrating the IDCT section in the device illustrated in FIG. 1.

FIG. 3 illustrates a configuration of the IDCT section 14. The IDCT section 14 successively performs two one-dimensional IDCT operations, first in the row direction and then in the column direction, thereby obtaining a result which is equivalent to what is obtained by a single two-dimensional IDCT operation. For performing the one-dimensional IDCT in the row direction, the IDCT section 14 includes a former-stage first memory 21a, a former-stage second memory 22a, a former-stage control section 23, a former-stage operation section 24 and a former-stage butterfly operation section 25. For performing the one-dimensional IDCT in the column direction, the IDCT section 14 includes a latter-stage first memory 21b, a latter-stage second memory 22b, a latter-stage control section 26, a latter-stage operation section 27, a latter-stage butterfly operation section 28 and a rounding operation section 29.

A busy signal xbusymc from the following section, i.e., the MC section 15, is applied to the latter-stage control section 26 and the latter-stage butterfly operation section 28. A busy signal xbusy2 is then output from the latter-stage control section 26 and is applied to the former-stage control section 23 and the former-stage butterfly operation section 25. A busy signal xbusy0 is then output from the former-stage control section 23 and is applied to the preceding section, i.e., the IQ section 13.

The former-stage control section 23 and the latter-stage control section 26 receive a data block which has been passed on from the former sections (i.e., the VLD section 11, the IS section 12 and the IQ section 13) and send the data block to the MC section 15.

The former-stage control section 23 receives a data block (12 bits/pixel) from the preceding section, i.e., the IQ section 13, and stores the data block in the former-stage first memory 21a. When finally receiving an end-of-block signal EOB indicating the end of the data block, the former-stage control section 23 stops storing the data block. Similarly, when receiving the next data block, the former-stage control section 23 starts storing the data block in the former-stage second memory 22a, and stops storing the data block in response to the end-of-block signal EOB indicating the end of the data block.

While the former-stage first memory 21a and the former-stage second memory 22a are both filled with respective data blocks, the former-stage control section 23 activates the busy signal xbusy0 to the preceding section, i.e., the IQ section 13. In response to this, the IQ section 13 discontinues data block transfer to the following section, i.e., the IDCT section 14.

The former-stage control section 23 stores a data block in the former-stage first memory 21a, and then reads out the stored data block to provide it to the former-stage operation section 24. Herein, if the data block is not completely filled with N×N pixels (e.g., 8×8=64 pixels) of data corresponding to one image block, it is provided to the former-stage operation section 24 with the unfilled, vacant locations thereof being each substituted with "0".

The former-stage operation section 24 performs a product sum operation (this will be described later) for this data and provides the operation result to the former-stage butterfly operation section 25. The former-stage butterfly operation section 25 repeatedly performs additions and subtractions of the transform result. Then, a rounding operation and a bit truncation operation are performed, and the transform result is sent to the latter-stage control section 26.

Regarding the processing of the data block stored in the former-stage first memory 21a, when the former-stage first memory 21a is vacant, the former-stage control section 23 inactivates the busy signal xbusy0 to the IQ section 13. In response to this, the IQ section 13 sends the next data block, and the former-stage control section 23 stores the data block in the vacant former-stage first memory 21a.

Successively after the data block stored in the former-stage first memory 21a is completely processed, the former-stage control section 23 reads out the data block stored in the former-stage second memory 22a. Herein, if the data block is not completely filled with 8×8 pixels of data corresponding to one image block, it is provided to the former-stage operation section 24 with the unfilled, vacant locations thereof being each substituted with "0".

The former-stage operation section 24 performs a product sum operation for this data and provides the operation result to the former-stage butterfly operation section 25. The former-stage butterfly operation section 25 repeatedly performs additions and subtractions of the transform result. Then, a rounding operation and a bit truncation operation are performed, and the transform result is sent to the latter-stage control section 26.

Regarding the processing of the data block stored in the former-stage second memory 22a, when the former-stage second memory 22a is vacant, the former-stage control section 23 inactivates the busy signal xbusy0 to the IQ section 13 so as to allow a data block to be sent and received from the preceding section, i.e., the IQ section 13.

Thus, a data block (12 bits/pixel) sent from the preceding section, i.e., the IQ section 13, is processed, while it is stored in either the former-stage first memory 21a or the former-stage second memory 22a. Then, the processed data block (16 bits/pixel), for which one-dimensional IDCT (column direction) has been performed, is sent to the latter-stage control section 26.

When neither of the former-stage first memory 21a nor the former-stage second memory 22a is vacant, the busy signal xbusy0 to the preceding section, i.e., the IQ section 13, is activated so as to discontinue the data block transfer from the IQ section 13.

When the busy signal xbusy2 from the latter-stage control section 26 is active, the former-stage control section 23 discontinues the operation of the former-stage operation section 24 and the former-stage butterfly operation section 25 so as to discontinue the data block transfer to the latter-stage control section 26.

Then, the latter-stage control section 26 successively receives data blocks (16 bits/pixel) from the former-stage butterfly operation section 25. The latter-stage control section 26 stores the data blocks selectively in the latter-stage first memory 21b and the latter-stage second memory 22b and then successively provide the data blocks in the memories 21b and 22b to the latter-stage operation section 27.

While the latter-stage first memory 21b and the latter-stage second memory 22b are both filled with respective data blocks, the latter-stage control section 26 activates the busy signal xbusy2 to the former-stage control section 23. In response to this, the former-stage control section 23 discontinues the data block transfer from the former-stage butterfly operation section 25 to the latter-stage control section 26.

The latter-stage control section 26 successively provides the data blocks stored in the latter-stage first memory 21b and the latter-stage second memory 22b to the latter-stage operation section 27. For each data block provided, the latter-stage operation section 27 performs a product sum operation, and provides the transform result to the latter-stage butterfly operation section 28. The latter-stage butterfly operation section 28 repeatedly performs additions and subtractions of the transform result. Then, the rounding operation section 29 performs a bit truncation operation for the transform result so as to leave 9 bits per pixel (whereby −256≦value of pixel≦256), and sends the result to the following section, i.e., the MC section 15, as a data block.

Thus, a data block (16 bits/pixel) sent from the former-stage butterfly operation section 25 is processed, while it is stored in either the latter-stage first memory 21b or the latter-stage second memory 22b. At this point of time, one-dimensional IDCT (row direction), and thus two-dimensional IDCT (together with the former-stage IDCT in the column direction), has been performed for the data block. This processed data block (9 bits/pixel) is sent to the following section, i.e., the MC section 15.

When neither of the latter-stage first memory 21b nor the latter-stage second memory 22b is vacant, the busy signal xbusy2 to the former-stage control section 23 is activated so as to discontinue the data block transfer from the former-stage butterfly operation section 25.

If the busy signal xbusymc from the following section, i.e., the MC section 15, is active, the latter-stage control section 26 activates the busy signal xbusy2 to the former-stage control section 23 when the latter-stage first memory 21b and the latter-stage second memory 22b both become full. Moreover, the latter-stage control section 26 discontinues the operation of the latter-stage operation section 27 and the latter-stage butterfly operation section 28 so as to discontinue the data block transfer to the following section, i.e., the MC section 15.

Figure 4:
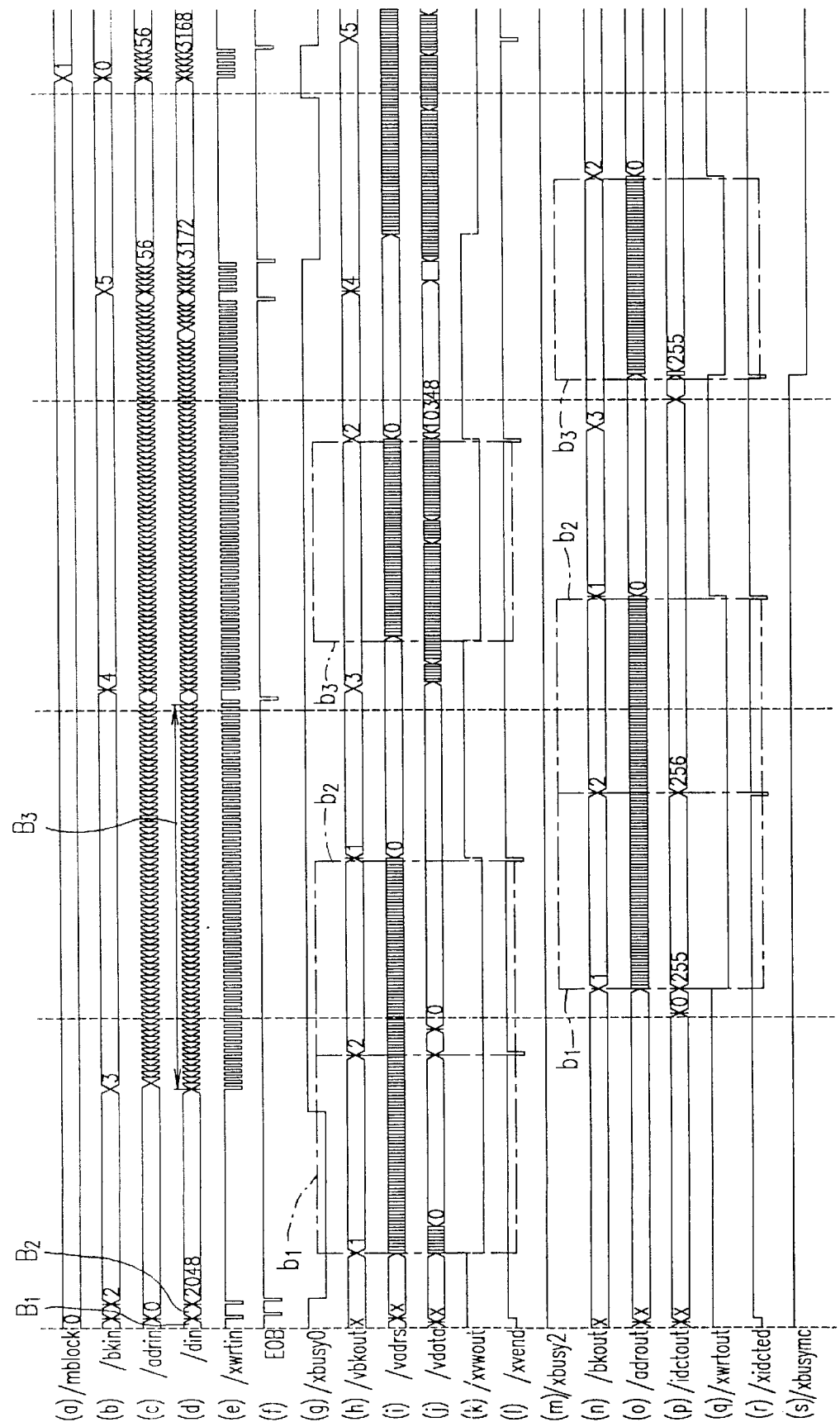
FIG. 4 is a timing diagram illustrating signals used in the IDCT section illustrated in FIG. 3.

FIG. 4 is a timing diagram illustrating signals used in the IDCT section 14. In the illustrated example, all the control signals are active-low signals.

In this timing diagram of FIG. 4, signals input to the former stage of the IDCT section 14 include a block number signal bkin indicated at (b), an address signal adrin indicated at (c), a data signal din indicated at (d), a write signal xwrtin indicated at (e) and an end-of-block signal EOB indicated at (f). When each of the two data blocks B1 and B2, represented by the data signal din, has been input, the end-of-block signal EOB becomes active. Then, the former-stage first memory 21a and the former-stage second memory 22a are filled with the data blocks B1 and B2, and the busy signal xbusy0 becomes active, thereby discontinuing the data block transfer from the preceding section, i.e., the IQ section 13.

Signals sent from the former stage to the latter stage of the IDCT section 14 include a block number signal vbkout indicated at (h) in FIG. 4, an address signal adrs indicated at (i), a data signal vdata indicated at (j) (representing respective data blocks), a valid signal xvwout indicated at (k) and a block completion signal xvend indicated at (l). While the valid signal xvwout is active, the address signal adrs and the data signal vdata are valid. For the signals (h) to (l), the one-dot-chain line b1 defines a time period in which a portion of the data signal vdata representing the data block B1 is transferred, while the one-dot-chain line b2 defines a time period in which another portion of the data signal vdata representing the data block B2 is transferred.

At a certain point of time during the period, in which a portion of the data signal vdata representing the data block B1 is transferred, the former-stage first memory 21a becomes vacant, and the busy signal xbusy0 indicated at (g) in FIG. 4 becomes inactive, thereby enabling a data block write operation to the former-stage first memory 21a. Thus, the former-stage first memory 21a is filled with the data block B3 ((d) in FIG. 4). At this point of time, the former-stage second memory 22a becomes vacant, whereby the busy signal xbusy0 is held inactive.

Similarly, signals sent from the latter stage of the IDCT section 14 to the MC section 15 include a block number signal bkout indicated at (n) in FIG. 4, an address signal adrout indicated at (o), a data signal idctout indicated at (p) (representing respective data blocks), a valid signal xwrtout indicated at (q) and a block completion signal xidcted. While the valid signal xwrtout is active, the address signal adrout and the data signal idctout are valid. For the signals (n) to (r), the one-dot-chain line b1 defines a time period in which a portion of the data signal idctout representing the data block B1 is transferred, while the one-dot-chain line b2 defines a time period in which another portion of the data signal idctout representing the data block B2 is transferred, and the one-dot-chain line b3 defines a time period in which still another portion of the data signal idctout representing the data block B3 is transferred.

When a busy signal xbusymc indicated at (s) becomes active, the output operation of the latter stage of the IDCT section 14 is discontinued. In the illustrated instance, a busy signal xbusy2 indicated at (m) is not active at this point of time. However, if neither the latter-stage first memory 21b nor the latter-stage second memory 22b is vacant, the busy signal xbusy2 becomes active, thereby discontinuing the output operation of the former stage of the IDCT section 14.

At the point of time when a busy signal becomes active, the address signal to each memory of the IDCT section 14 is being output. Therefore, another busy signal is created one cycle after the above activation of the busy signal. In response to this one-cycle-delayed busy signal, the respective input operations of the registers for receiving the respective outputs from the memories are discontinued, thereby preventing the respective outputs from the memories to be lost.

Figure 5:
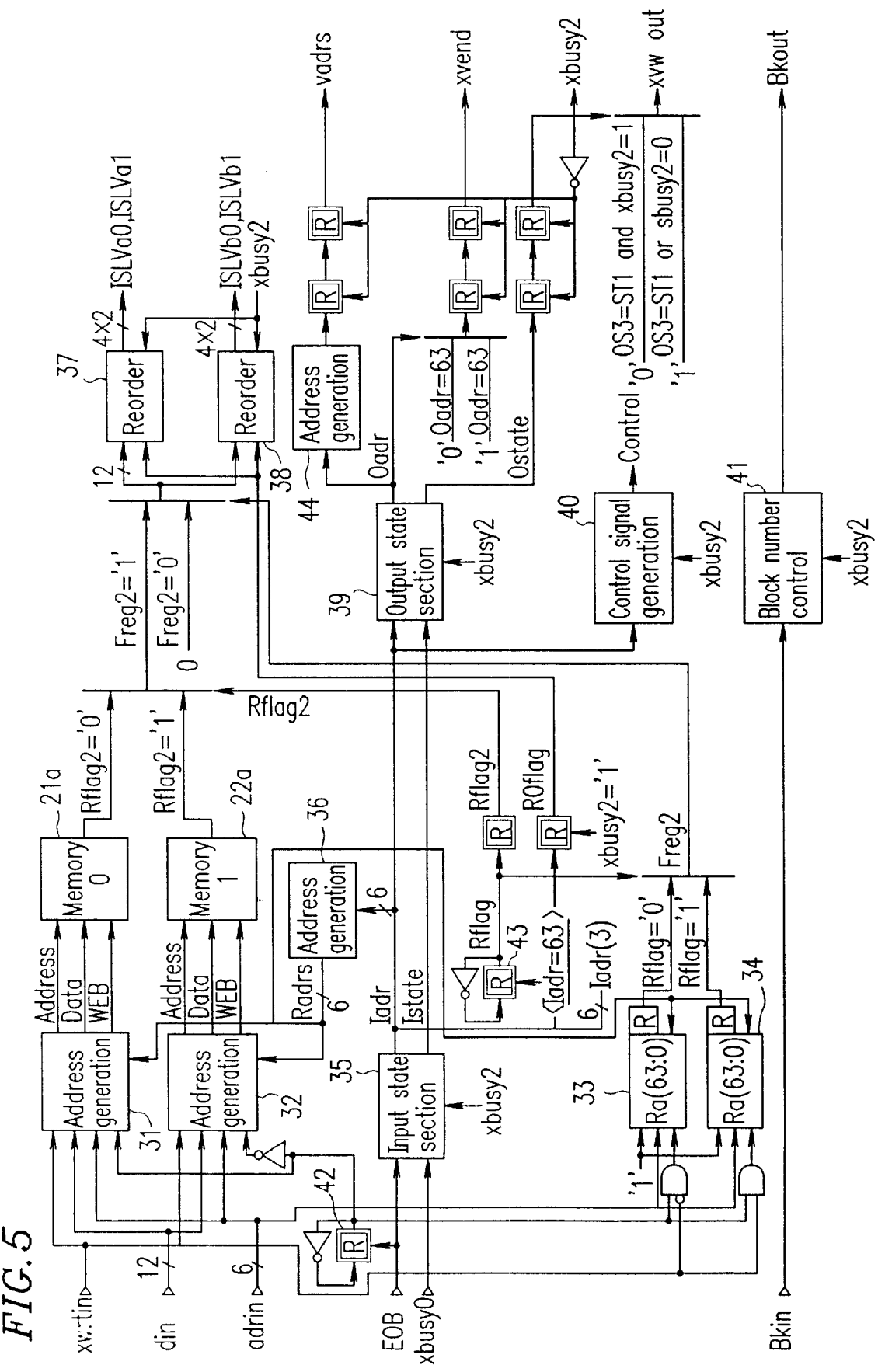
FIG. 5 is a block diagram illustrating a configuration of the former-stage control section of the IDCT section illustrated in FIG. 4.
Figure 10:
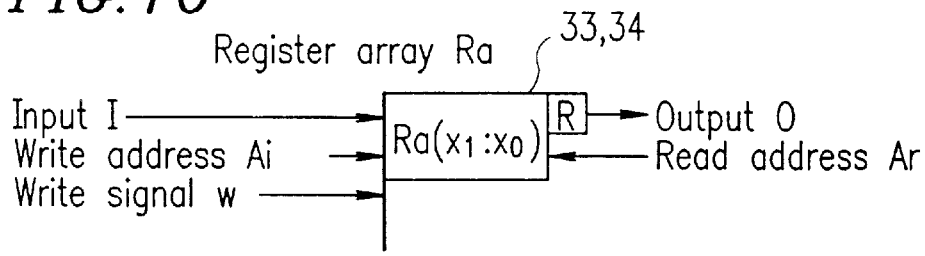
FIG. 10 is a diagram illustrating operation condition of a flag register array in the former-stage control section illustrated in FIG. 5.
Figure 11:
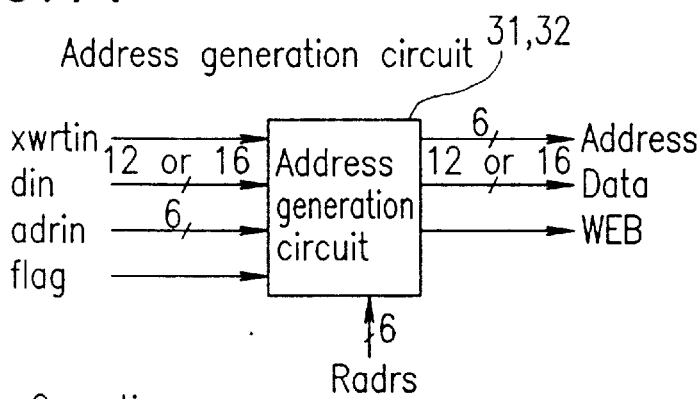
FIG. 11 is a diagram illustrating operation condition of an address generation section in the former-stage control section illustrated in FIG. 5.

FIG. 5 illustrates a configuration of the former-stage control section 23 of the IDCT section 14 in the image processing device of the illustrated example. Referring to FIG. 5, the data signal din and the address signal adrin, representing a data block from the preceding section, i.e., the IQ section 13, are stored in either the former-stage first memory 21a or the former-stage second memory 22a via one of address generation sections 31 and 32.

For example, the data signal din and the address signal adrin, representing a data block, are stored in the former-stage first memory 21a via the address generation section 31. Accordingly, the address signal adrin is stored in a flag register array 33.

When receiving the end-of-block signal EOB indicating the end of the data block, an input state section 35 applies, to an address generation circuit 36, an input address counter signal Iadr, based on which 8×8 pixels of data (corresponding to one image block) can be successively output. In response to this, a read address signal Radrs is supplied from the address generation circuit 36 to the address generation circuit 31, and the address generation circuit 31 indicates a read address Address to the former-stage first memory 21a, thereby outputting the data block from the former-stage first memory 21a. The data block is written to a reordering section 37, with the data arrangement thereof being altered.

Herein, if the data block is not completely filled with 8×8 pixels of data corresponding to one image block, the unfilled, vacant locations thereof have to be each substituted with "0". To do so, the input address counter signal Iadr is also applied to the flag register array 33 so that the address signal adrin is output therefrom. As long as the address signal adrin is output from the flag register array 33, the data block is output from the former-stage first memory 21a. Based on the input address counter signal Iadr, 8×8 pixels of data (corresponding to one image block) can be successively output. If the supply of data block from the former-stage first memory 21a is discontinued before the end of the input address counter signal Iadr, it means that the data block is not completely filled with 8×8 pixels of data corresponding to one image block, whereby the transmission of the address signal adrin from the flag register array 33 is also discontinued. Thus, when the transmission of the address signal adrin from the flag register array 33 is discontinued before the end of the input address counter signal Iadr, a flag Freg2 is switched to "0", and "0"s are written to the reordering section 37 following the data block until the end of the input address counter signal Iadr, so as to completely fill the data in the reordering section 37 with 8×8 pixels of data corresponding to one image block.

The data in the reordering section 37 is sliced into 4 bit×2 word slices for the operation performed by the former-stage operation section 24, which will be described later. Each slice of data ISLVa is sent to the former-stage operation section 24.

On the other hand, in response to the end-of-block signal EOB indicating the end of the data block, the input state section 35 outputs the input address counter signal Iadr used for successively outputting 8×8 pixels of data (corresponding to one image block). The input state section 35 also determines the state of the former-stage first memory 21a and the former-stage second memory 22a to be one of the following: ST0 where both memories are vacant; ST1 where one of them is filled with data; and ST2 where both of them are filled with data. When the state ST2 is detected, the busy signal xbusy0 to the preceding section, i.e., the IQ section 13, is activated.

Such state determination is performed based on the transition conditions shown in FIG. 6. As can be seen from FIG. 6, the input state section 35 determines the state of the memories to be ST0, indicating that both of them are vacant, while the memories are in the initial state and waiting for an input. The input state section 35 determines the state to be ST1 indicating that one of the memories is filled with data, when the end-of-block signal EOB becomes active; and determines state to be ST2 indicating that both of the memories are filled with data, when the end-of-block signal EOB becomes active again while the input address counter signal Iadr<63 is true (i.e., the output of the input address counter signal Iadr, based on which 8×8 pixels of data (corresponding to one image block) can be successively output, is not yet complete).

Moreover, when Iadr=63 becomes true (i.e., the output of the input address counter signal Iadr is complete) during the state ST2, the input state section 35 determines the state to be ST1 indicating that one of the memories is filled with data. Furthermore, when Iadr=63 becomes true again while the end-of-block signal EOB is inactive during the state ST1, the input state section 35 determines the state to be ST0 indicating both memories are vacant.

When receiving the busy signal xbusy2 from the following section, the input state section 35 discontinues the output of the input address counter signal Iadr, but does not activate the busy signal xbusy0 until the state of the memories becomes ST2. In this way, the data block transfer from the preceding section is continuously performed until the former-stage first memory 21a and the former-stage second memory 22a are both filled with data, thereby realizing an efficient operation.

As illustrated in FIG. 7, an output state section 39 stays in the waiting state ST0 until the input address counter signal Iadr from the input state section 35 becomes a preset value. Subsequently, when the state becomes ST1 indicating to output the operation result, the output state section 39 outputs an output address counter signal Oadr so as to instruct the latter section to output data. Moreover, the output state section 39 returns back to the waiting state ST0, when an output flag WaitFlag becomes active or the signal from the input state section 35 indicates the state ST0 after completing the output of the output address counter signal Oadr.

Furthermore, the output state section 39 discontinues the output of the output address counter signal Oadr when it receives the busy signal xbusy2 from the following section.

The output address counter signal Oadr is transformed into an address signal, which is then output to the following section.

A control signal generation section 40 creates a control signal Control based on the input address counter signal Iadr from the input state section 35, and outputs the control signal Control.

A block number control section 41 receives the block number signal bkin from the preceding section, and sends the block number signal vbkout to the following section.

FIGS. 8, 9, 10 and 11 illustrate respective operation conditions of the registers, the flag register arrays and the address generation sections in the former-stage control section 23.

While only the configuration of the former-stage control section 23 is illustrated herein, the latter-stage control section 26 have substantially the same configuration. The difference therebetween is that a 12 bits/pixel data block is input to the former-stage control section 23, while a 16 bits/pixel data block is input to the latter-stage control section 26. Moreover, the flag register arrays 33 and 34 are omitted in the latter-stage control section 26.

Figure 12:
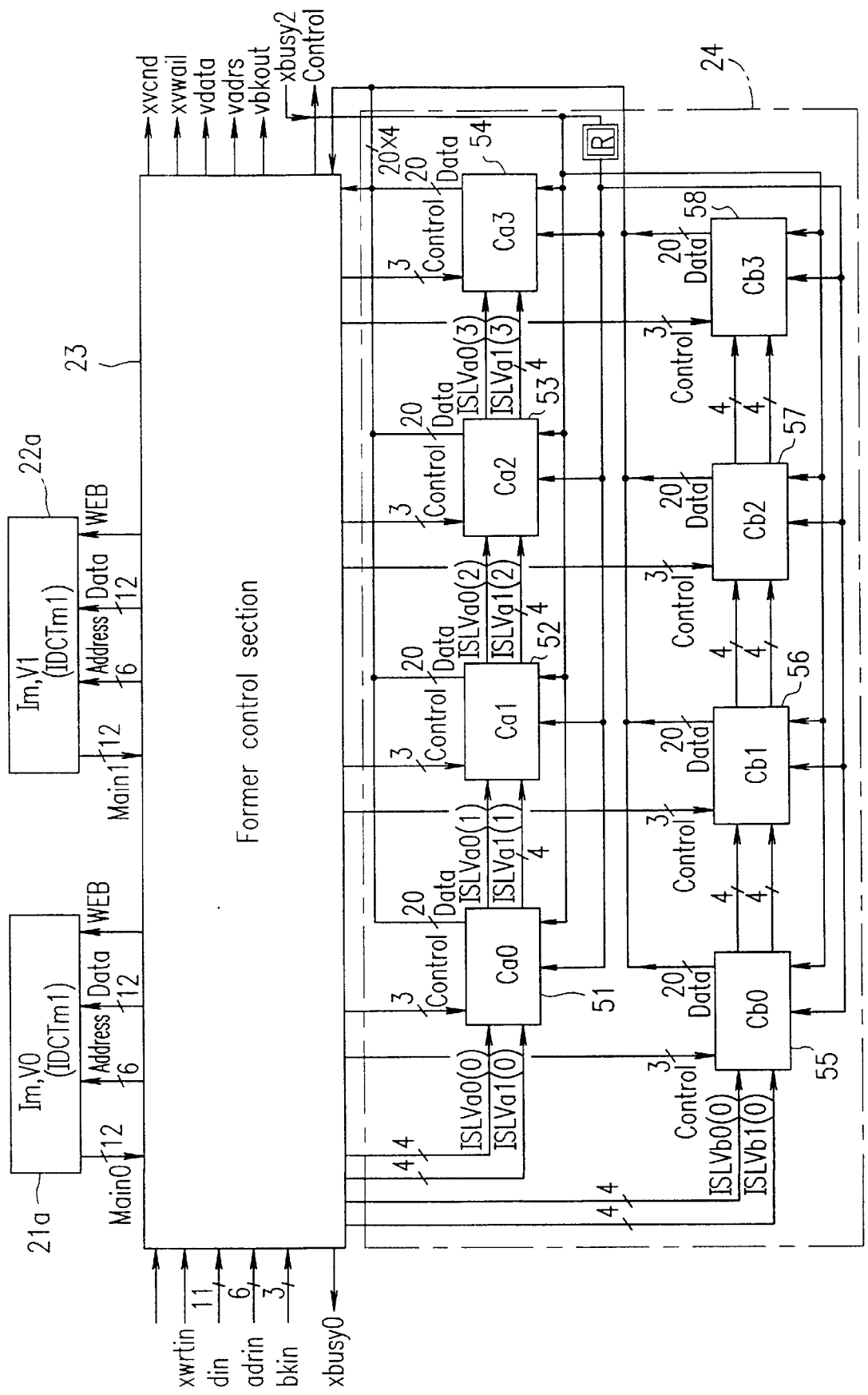
FIG. 12 is a block diagram illustrating the former-stage operation section in the IDCT section illustrated in FIG. 4.

FIG. 12 illustrates the configuration of the former-stage operation section 24 provided in the IDCT section 14 of the image processing device according to the illustrated example. As described above, the former-stage operation section 24 performs one-dimensional IDCT (row direction) for input data blocks. The one-dimensional IDCT is based on the DA (Distributed Arithmetic) method. Based on this DA method, in the former-stage control section 23, each data block is sliced into 4 bit×2 word slices by the respective reordering sections 37 and 38, so as to send each slice of data ISLVa to the former-stage operation section 24, as described above.

The slice of data ISLVa is provided to either a column of product sum operation sections 51 to 54 or another column of product sum operation sections 55 to 58.

When receiving the slice of data ISLVa, the column of product sum operation sections 51 to 54 performs a product sum operation, as represented by Expression (6) below, based on the DA method. Similarly, the column of product sum operation sections 55 to 58, when receiving the slice of data ISLVa, performs a product sum operation, as represented by Expression (7) below, based on the DA method. Each of the product sum operations represented by Expressions (6) and (7) is a variant of Expression (5) above and represents one-dimensional IDCT.

$$\begin{pmatrix} x_0 + x_7 \\ x_1 + x_6 \\ x_2 + x_5 \\ x_3 + x_4 \end{pmatrix} = \begin{pmatrix} C_4 & C_2 & C_4 & C_6 \\ C_4 & C_6 & -C_4 & -C_2 \\ C_4 & -C_6 & -C_4 & C_2 \\ C_4 & -C_2 & C_4 & -C_6 \end{pmatrix} \begin{pmatrix} y_0 \\ y_2 \\ y_4 \\ y_6 \end{pmatrix} \quad (6)$$

$$\begin{pmatrix} x_0 - x_7 \\ x_1 - x_6 \\ x_2 - x_5 \\ x_3 - x_4 \end{pmatrix} = \begin{pmatrix} C_1 & C_3 & C_5 & C_7 \\ C_3 & -C_7 & -C_1 & -C_5 \\ C_5 & -C_1 & f_7 & C_3 \\ C_7 & -C_5 & C_3 & -C_1 \end{pmatrix} \begin{pmatrix} y_1 \\ y_3 \\ y_5 \\ y_7 \end{pmatrix} \quad (7)$$

In Expressions (6) and (7), $Ci = \cos(i\pi/16)$.

When such an operation is performed, the former-stage operation section 24 sends the operation result to the former-stage butterfly operation section 25 after waiting for a time period corresponding to 20 bits.

Figure 13:
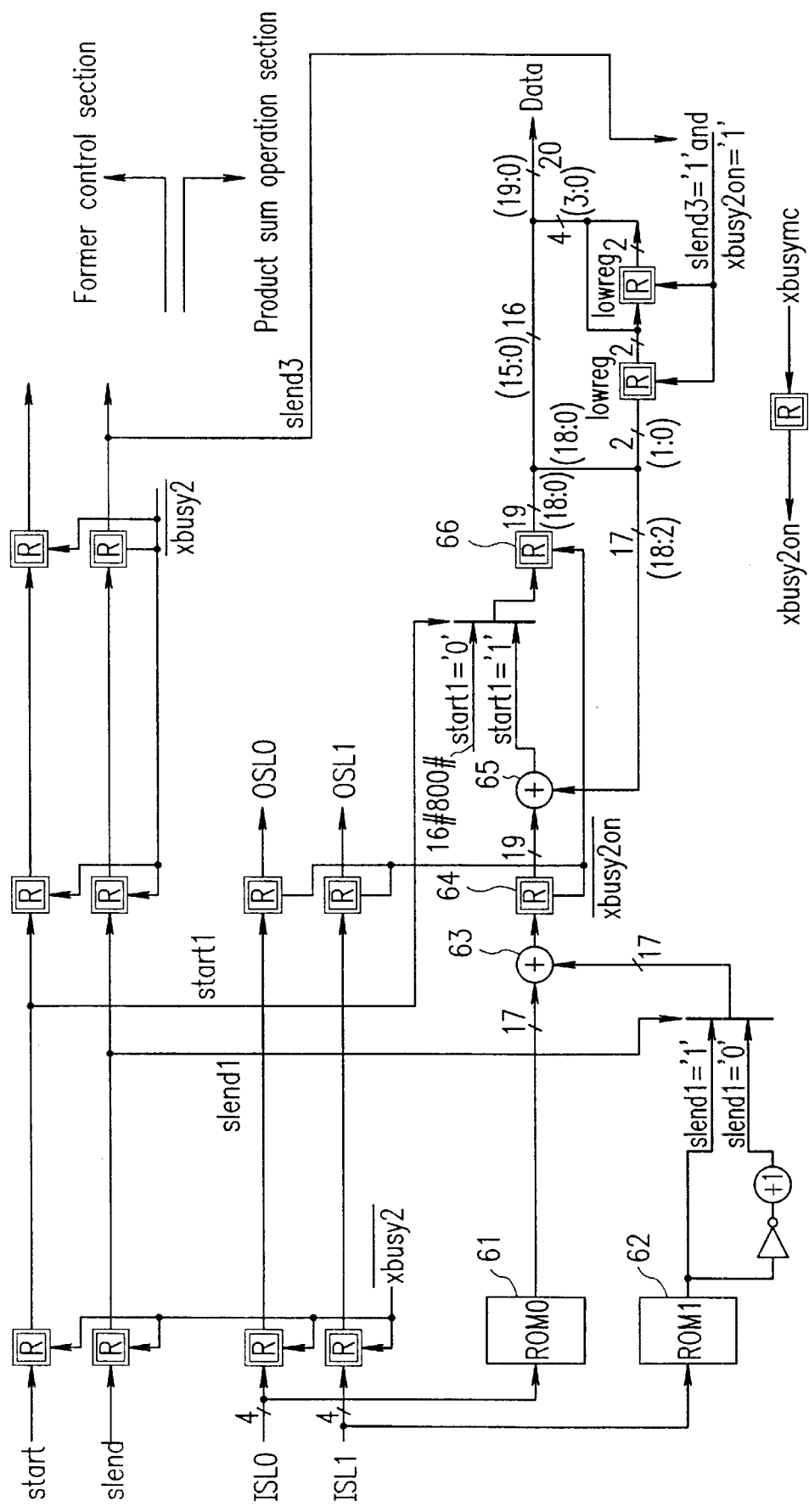
FIG. 13 is a block diagram illustrating product sum operation sections in the former-stage operation section illustrated in FIG. 12.

FIG. 13 illustrates one of the product sum operation sections 51 to 54 in the former-stage operation section 24. Herein, two words of sliced data ISLVa are input at a time so as to simultaneously determine the respective partial products. Therefore, two ROMs 61 and 62 are provided, each of which stores data corresponding the coefficient matrix C4, C2, . . . , in Expression (6).

The two words of sliced data ISLVa are input as the respective addresses for the ROMs 61 and 62, and the respective partial products are output from the ROMs 61 and 62. The partial products are added together by an adder 63, and the sum is stored in the first register 64. In the step of inputting the next two words of sliced data ISLVa, the sum is stored in the second register 66 via an adder 65. Then, in the next step, the sums in the first and second registers 64 and 66 are added together and stored in the second register 66, so as to be output therefrom subsequently.

The addition of the partial products starts from the lower bit side. When returning the sum stored in the second register 66 back to the adder 65, addition is performed after a 2-bit shift operation. Moreover, in order to perform a rounding operation in the former-stage butterfly operation section 25, it is necessary to add 0.5 to the operation result. The addition of the constant is performed in the product sum operation sections 51 to 54. A register lowreg for storing 2×2=4 bits is provided for each of the lower two bits in order to ensure the bit accuracy. Therefore, the 20 bits from the registers lowreg and the second register 66 together are output as the operation result. The number of bits, 20, used herein has been determined as a result of accuracy evaluations.

When the busy signal xbusy2 from the latter-stage control section 26 becomes active, the output from the respective registers is discontinued.

Figure 14:
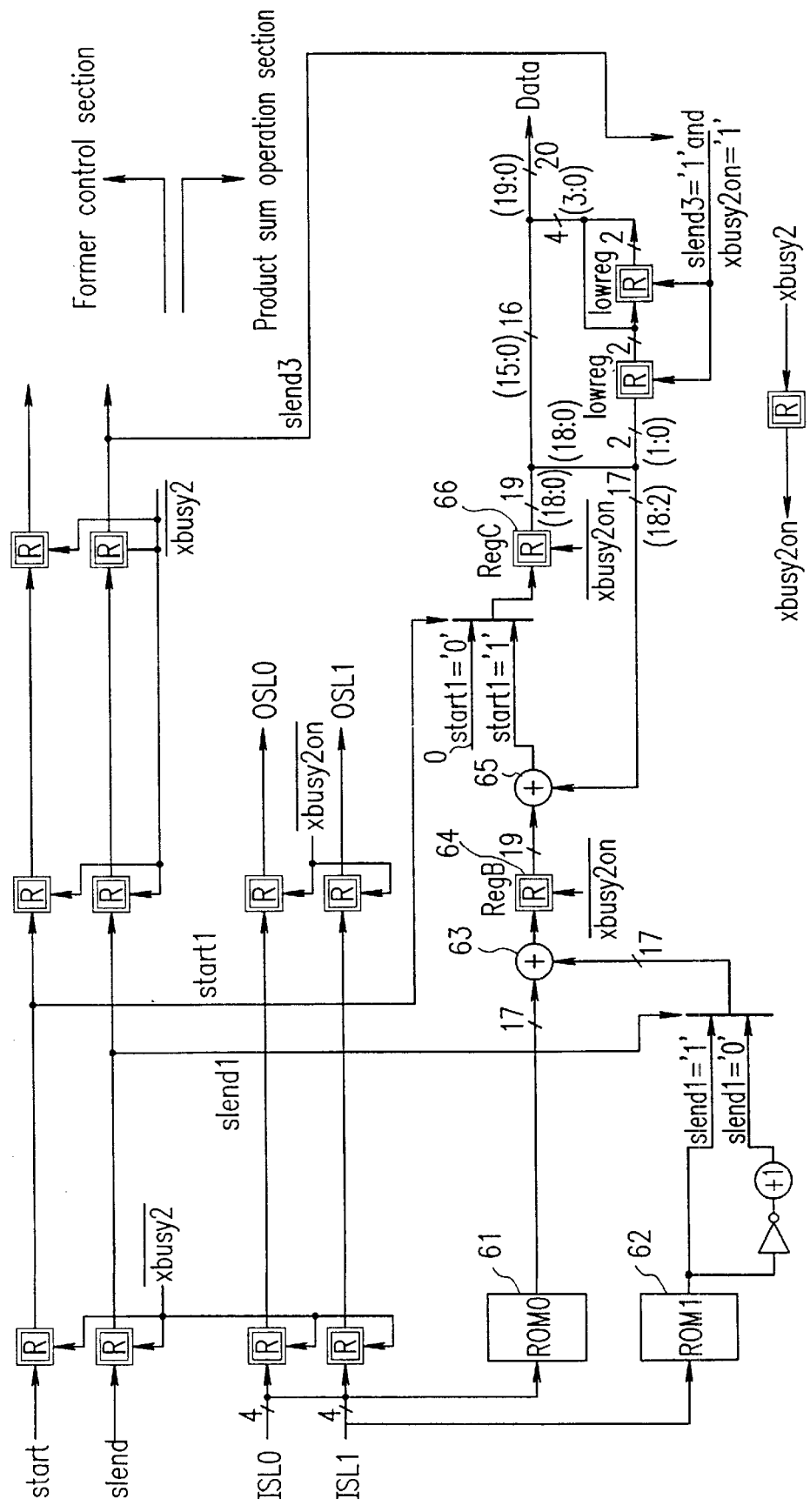
FIG. 14 is a block diagram illustrating other product sum operation sections in the former-stage operation section illustrated in FIG. 12.

FIG. 14 illustrates the product sum operation sections 55 to 58 in the former-stage operation section 24. The product sum operation sections 55 to 58 have the same configuration as that of the product sum operation sections 51 to 54, but is different in that the second register 66 is initially set to "0".

Figure 15:
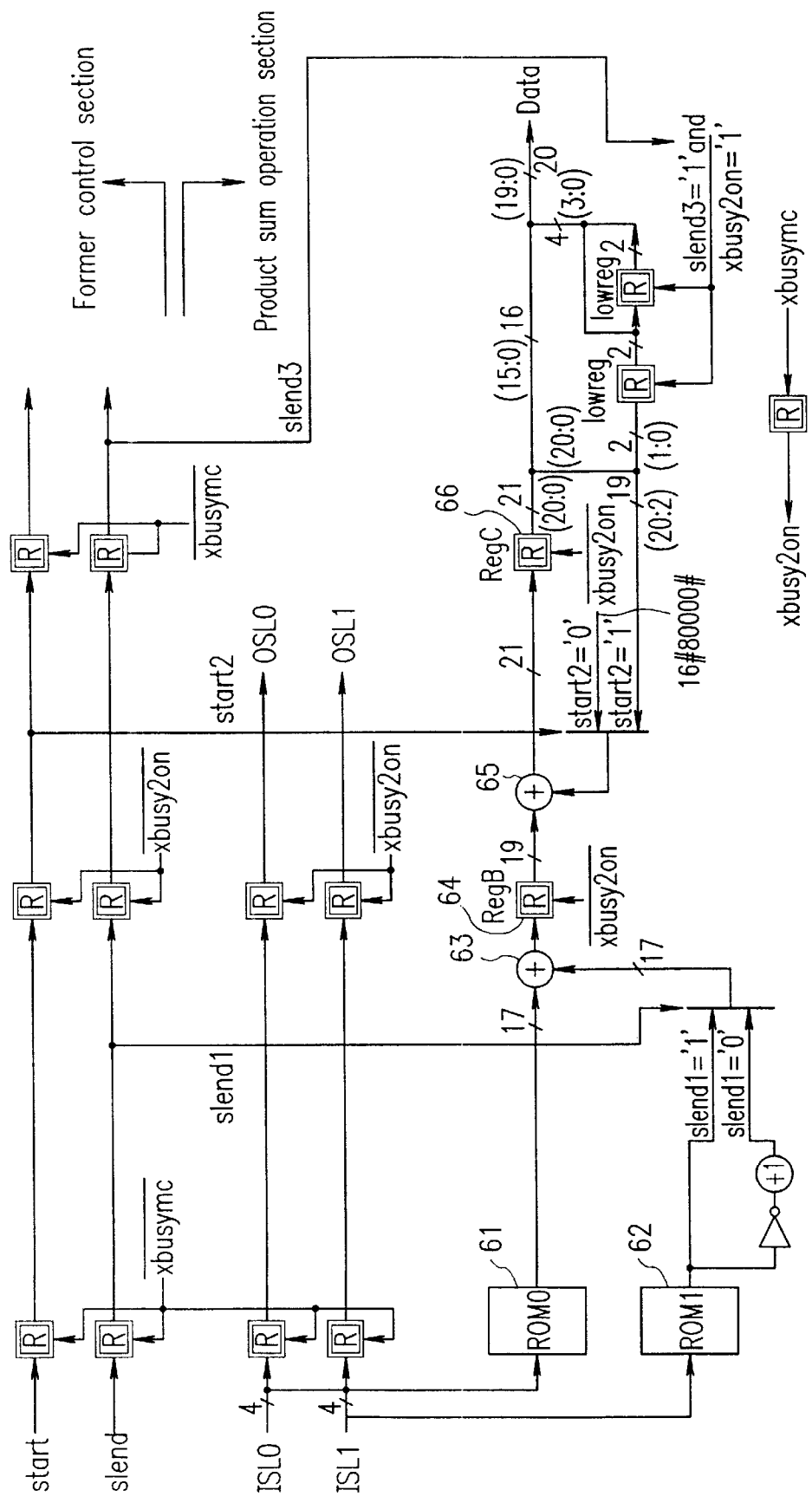
FIG. 15 is a block diagram illustrating product sum operation sections in the latter-stage operation section.

While only the former-stage operation section 24 has been described above, the latter-stage operation section 27 has substantially the same configuration. The difference therebetween is in the configuration of the product sum operation sections 51 to 54 and 55 to 58. The product sum operation sections 51 to 54 in the latter-stage operation section 27 have the configuration, as illustrated in FIG. 15, which differs from the configuration of the product sum operation sections 51 to 54 illustrated in FIG. 13, in the following points: the constant is added without being stored in the second register 66; a different constant is used for addition for ensuring accuracy; and, therefore, the number of bits is different.

Figure 16:
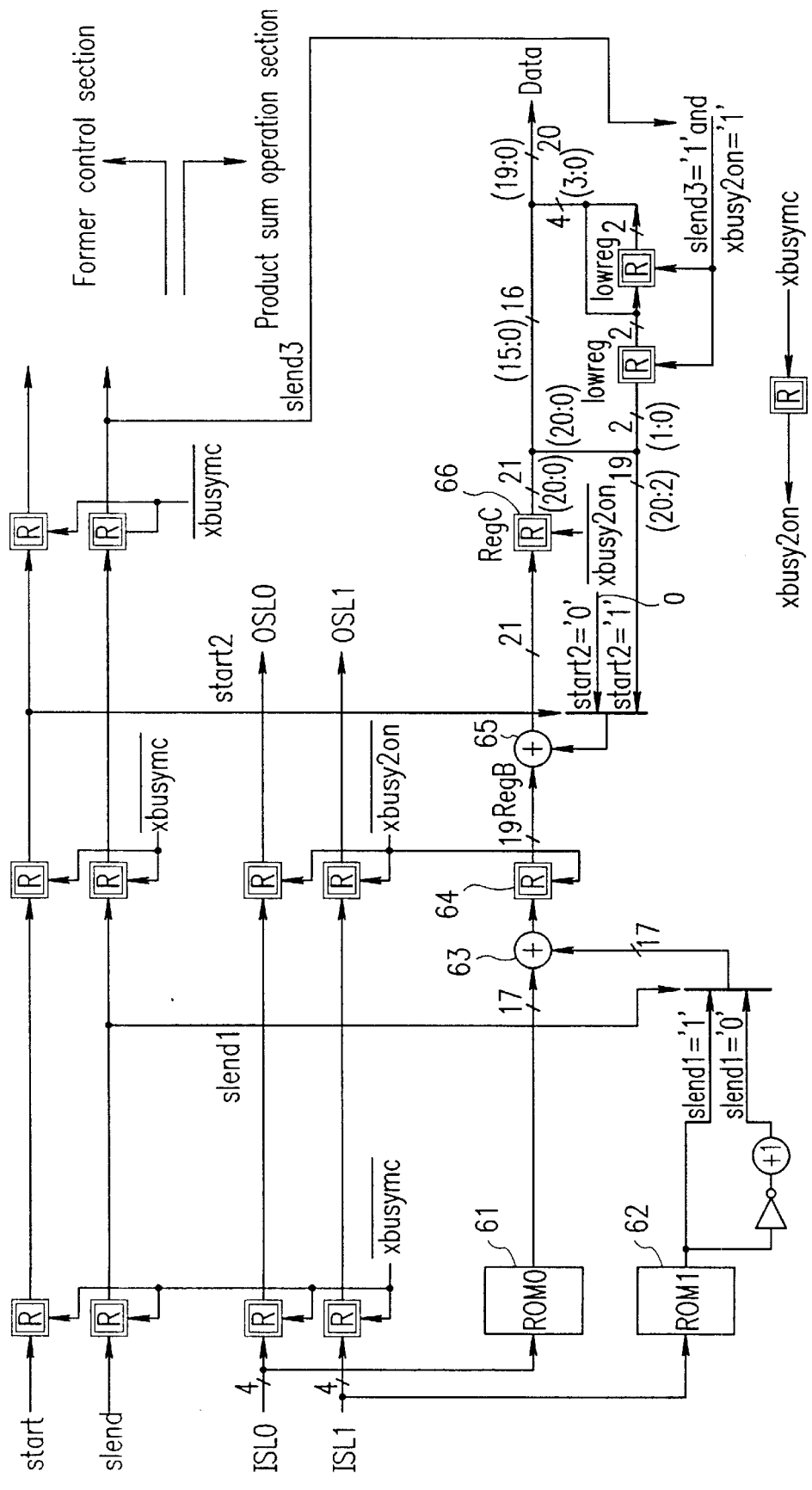
FIG. 16 is a block diagram illustrating other product sum operation sections in the latter-stage operation section.

Moreover, the product sum operation sections 55 to 58 in the latter-stage operation section 27 have the configuration, as illustrated in FIG. 16, which differs from the configuration of the product sum operation sections 55 to 58 illustrated in FIG. 14, in that the addition of the constant is omitted.

Figure 17:
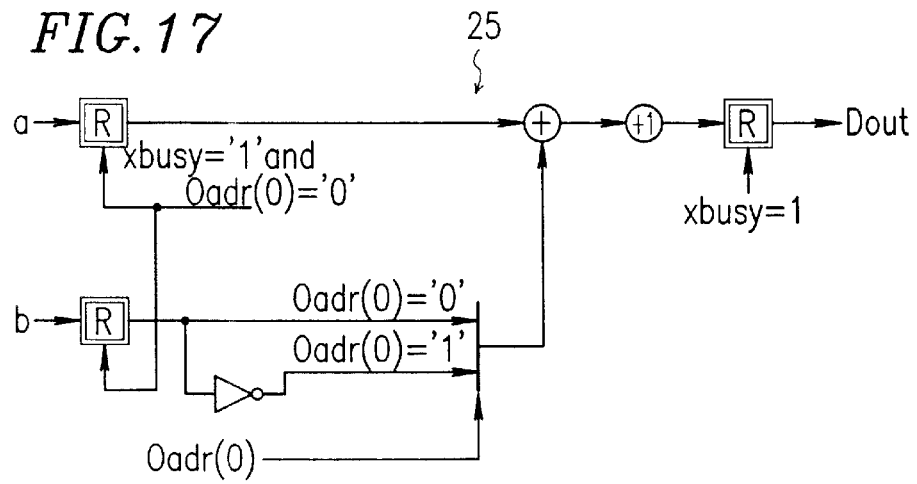
FIG. 17 is a block diagram illustrating the former-stage butterfly operation section in the IDCT section illustrated in FIG. 4.
Figure 18A:
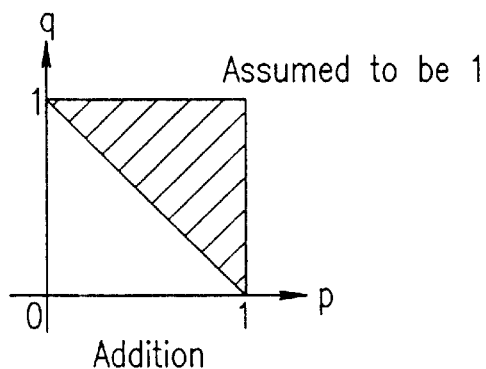
FIG. 18A is a graph illustrating the addition operation performed by the former-stage butterfly operation section in FIG. 17.
Figure 18B:
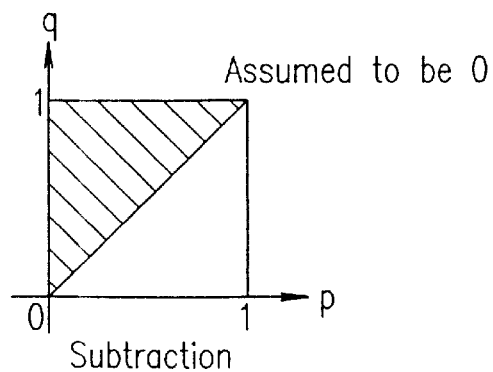
FIG. 18B is a graph illustrating the subtraction operation performed by the former-stage butterfly operation section in FIG. 17.
Figure 19:
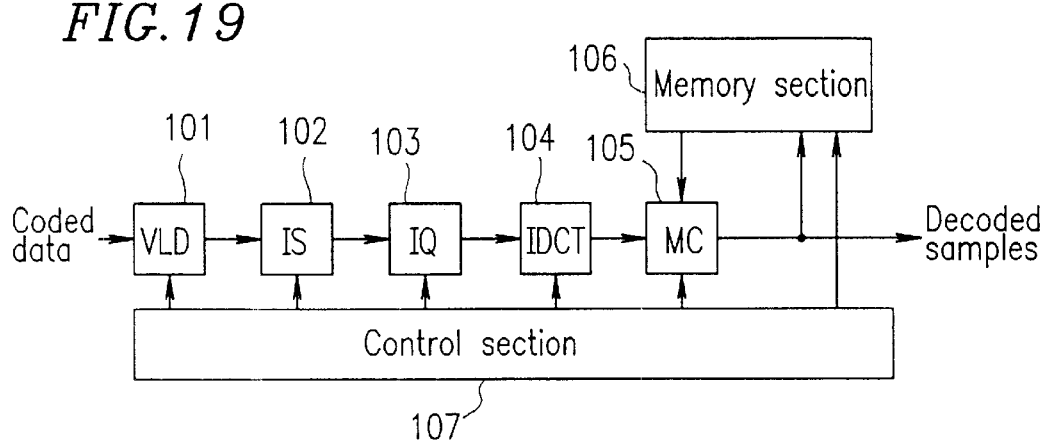
FIG. 19 is a block diagram schematically illustrating an image processing device employing IDCT based on the MPEG standard.
Figure 20:
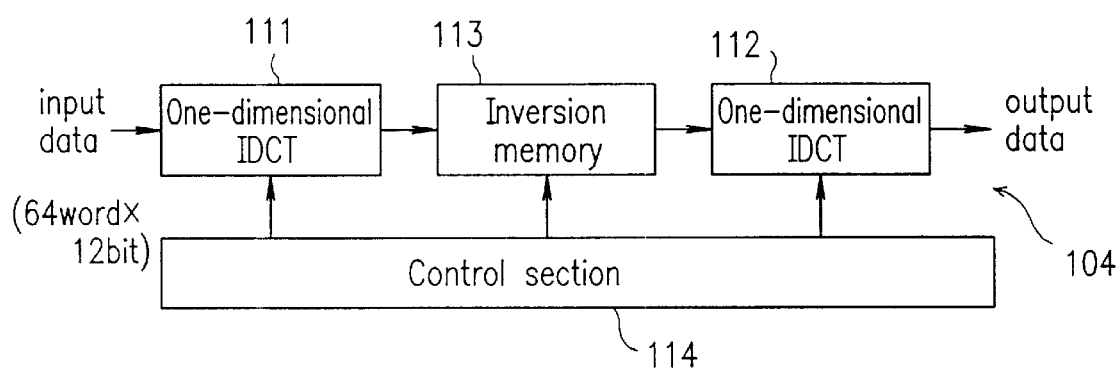
FIG. 20 is a block diagram illustrating a conventional IDCT section in the image processing device illustrated in FIG. 19.
Figure 21:
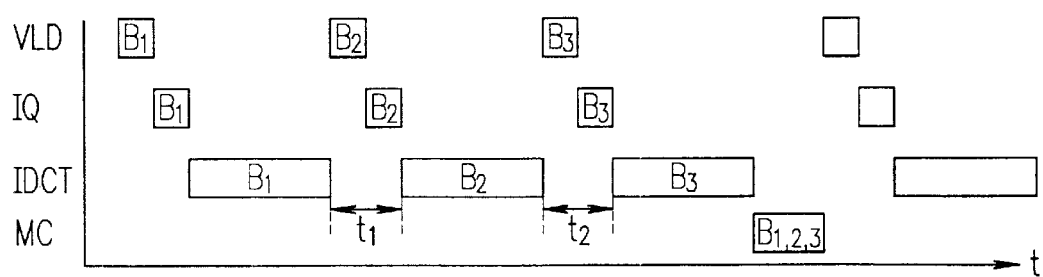
FIG. 21 is a timing diagram illustrating operation timings of the processing sections illustrated in FIG. 19.

The former-stage butterfly operation section 25, which has a configuration as illustrated in FIG. 17, successively receives data a and data b from the former-stage operation section 24, and repeatedly performs an addition operation a+b and a subtraction operation a−b. Herein, "1" is further added to the addition result (a+b), while the subtraction result is used intact. This is an effective method because it can be realized with a simple circuit while the value obtained based on the present example accurately matches with the accurate value obtained by a preset calculation within the hatched regions in the graphs of FIGS. 18A and 18B, where $a=\alpha+p$ and $b=\beta+q$ ($\alpha$, $\beta$: integral part, p, q: fractional part).

Moreover, the former-stage butterfly operation section 25 performs a bit truncation operation of the addition result from 21 bits down to 16 bits and another truncation operation of the subtraction result also from 21 bits down to 16 bits.

The operation result obtained as described above is sent to the latter-stage control section 26 as the data signal vdata.

Note that the latter-stage butterfly operation section 28 performs an operation similar to that performed by the former-stage butterfly operation section 25, but differs in that the latter-stage butterfly operation section 28 does not perform the bit truncation operation.

The latter-stage butterfly operation section 28 does not perform the bit truncation operation, but the rounding operation section 29, instead, takes the upper 11 bits out of the operation result received from the latter-stage butterfly operation section 28 so as to obtain and output the data signal idctout of 9 bits. This is done in order that the value of the data signal idctout satisfies a condition: $-256 \leq idctout \leq 256$.

As described above, an image block is created by decoding a macroblock of data, including a plurality of data blocks. A series of processing sections are provided each having a certain operation to perform. When one of the sections is unable to receive a data block, the section sends a busy signal to the preceding section. When one of the sections receives a busy signal, the section discontinues data block transfer to the following section. As a result, data blocks can be transferred through the series of sections in a reduced period of time.

Moreover, the processing section responsible for IDCT successively performs IDCT for a plurality of data blocks while the data blocks are successively stored, and then erases the stored data block when the data block has been completely processed. When the section is unable to store another data block, it sends a busy signal to the preceding section. Therefore, the plurality of data blocks can be processed uninterruptedly without any time gap resulting between two data blocks.

Furthermore, as described above, the section responsible for IDCT may repeat one-dimensional IDCT twice.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An image processing device, comprising:
   a plurality of processing sections for successively receiving and decoding a plurality of data blocks, obtained by encoding a plurality of image blocks of an image, the plurality of processing sections including an inverse discrete cosine transform processing section for performing a two-dimensional inverse discrete cosine transform, wherein:
      when any one of the processing sections is unable to receive a data block, the any one of the processing sections sends a busy signal to a preceding one of the processing sections and, when the preceding one of the processing sections receives the busy signal, the preceding one of the processing sections discontinues data block transfer to the any one of the processing sections.

2. An image processing device according to claim 1, wherein the inverse discrete cosine transform processing section comprises:
   a memory section for temporarily storing a plurality of data blocks;
   an operation section for successively performing an inverse discrete cosine transform for the data blocks stored in the memory section; and
   a control section for successively storing the data blocks in the memory section, the control section sending a busy signal to a preceding one of the processing sections when the memory section is filled.

3. An image processing device according to claim 2, wherein the control section further erases one of the data blocks stored in the memory section which has been processed so that a new data block may be stored in the memory section, while another one of the data blocks in the memory section is being processed by the operation section.

4. An image processing device according to claim 2, wherein:
   the memory section comprises first and second memory sections, each for temporarily storing a plurality of data blocks;
   the operation section comprises first and second operation sections, each for performing a one-dimensional inverse discrete cosine transform; and
   wherein each one of the data blocks is first stored in the first memory section where the first operation section performs a one-dimensional inverse discrete cosine transform for the data block, after which the data block is transferred to the second memory section where the second operation section performs a one-dimensional inverse discrete cosine transform for the data block, thus performing a two-dimensional inverse discrete cosine transform for the data block.

5. An image processing device according to claim 4, wherein:
   the control section comprises first and second control sections respectively for controlling the first and second operation sections;
   the first control section erases one of the data blocks stored in the first memory section which has been processed so that a new data block may be stored in the first memory section, while another one of the data blocks in the first memory section is being processed by the first operation section; and the second control section erases one of the data blocks stored in the second memory section which has been processed so that a new data block may be stored in the second memory section, while another one of the data blocks in the second memory section is being processed by the second operation section.

6. An image processing device according to claim 4, wherein:

the control section comprises first and second control sections respectively for controlling the first and second operation sections; and the first control section sends a busy signal to a preceding one of the processing sections when the first and second memory sections are both filled.

7. An image processing device according to claim 6, wherein the second control section sends a busy signal to the first control section when the second memory section is filled.

8. An image processing device according to claim 1, wherein:

each of the processing sections is provided with a memory section for storing at least one data block; and one of the processing sections sends a busy signal to a preceding one of the processing sections when the memory section of the one of the processing sections is filled.

9. An image processing device according to claim 1, wherein the plurality of processing sections include: a variable length decoding section; an inverse scan section; an inverse quantization section; an inverse DCT section; and a motion compensation section.

10. An image processing device according to claim 9, wherein:

each of the variable length decoding section, inverse scan section, the inverse quantization section and the inverse DCT section is provided with a memory section for storing at least one data block; and one or more of the variable length decoding section, inverse scan section, the inverse quantization and the inverse DCT section sends a busy signal to a preceding one of the processing sections when the memory section of the one of the sections is filled.

11. An image processing device according to claim 9, wherein the motion compensation section comprises a memory section for storing a plurality of data blocks, and sends a busy signal to a preceding one of the processing sections when the memory section of the motion compensation section is filled with a plurality of data blocks.

12. An image processing device, comprising:

a plurality of processing sections for successively receiving and decoding a plurality of data blocks, obtained by encoding a plurality of image blocks of an image, the plurality of processing sections including an inverse discrete cosine transform processing section for performing a two-dimensional inverse discrete cosine transform, wherein the inverse discrete cosine transform processing section includes, a memory section for temporarily storing a plurality of data blocks;

an operation section for successively performing an inverse discrete cosine transform for the plurality of data blocks stored in the memory section; and a control section for erasing one of the data blocks stored in the memory section which has been processed so that a new data block may be stored in the memory section, while another one of the data blocks in the memory section is being processed by the operation section.

13. An image processing device according to claim 12, wherein:

the memory section comprises first and second memory sections, each for temporarily storing a plurality of data blocks;

the operation section comprises first and second operation sections each for performing a one-dimensional inverse discrete cosine transform; and wherein each one of the data blocks is first stored in the first memory section where the first operation section performs a one-dimensional inverse discrete cosine transform for the data block, after which the data block is transferred to the second memory section where the second operation section performs a one-dimensional inverse discrete cosine transform for the data block, thus performing a two-dimensional inverse discrete cosine transform for the data block.

14. An image processing device according to claim 13, wherein:

the control section comprises first and second control sections respectively for controlling the first and second operation sections;

the first control section erases one of the data blocks stored in the first memory section which has been processed so that a new data block may be stored in the first memory section, while another one of the data blocks in the first memory section is being processed by the first operation section; and the second control section erases one of the data blocks stored in the second memory section which has been processed so that a new data block may be stored in the second memory section, while another one of the data blocks in the second memory section is being processed by the second operation section.

15. An image processing method, comprising:

successively receiving and decoding encoded data blocks of an image in a plurality of processing sections, the plurality of processing sections including an inverse discrete cosine transform (IDCT) processing section for performing a two-dimensional inverse discrete cosine transform; and sending a busy signal to a preceding one of the processing sections when any one of the processing sections is unable to receive a data block; and discontinuing data block transfer to the any one of the processing sections by the preceding one of the processing sections, when the preceding one of the processing sections receives the busy signal.

16. The image processing method of claim 15, wherein the IDCT temporarily stores a plurality of data blocks in a memory, successively performs an inverse discrete cosine transform for the data blocks stored in memory and sends a busy signal to a preceding one of the processing sections when the memory is filled.

17. The image processing method of claim 16, wherein the IDCT further erases a stored data block which has been processed so that a new data block may be stored in the memory.

18. The image processing method of claim 16, wherein the IDCT performs two successive one-dimensional inverse discrete cosine transform for each data block.

19. The method of claim 15, wherein each of the plurality of processing sections includes a memory and wherein a busy signal is sent when a memory of one of the processing sections is filled.

20. An image processing device according to claim 1, wherein each section in the plurality of processing sections operates individually at their own operation timing.

21. An image processing device according to claims 12, wherein each section in the plurality of processing sections operates individually at their own operation timing.

22. An image processing device according to claim 15, wherein each section in the plurality of processing sections operates individually at their own operation timing.

* * * * *